Dec. 21, 1954
R. S. ZEBARTH
2,697,246
POULTRY HOLDING SHACKLE
Filed Sept. 5, 1950
2 Sheets-Sheet 1
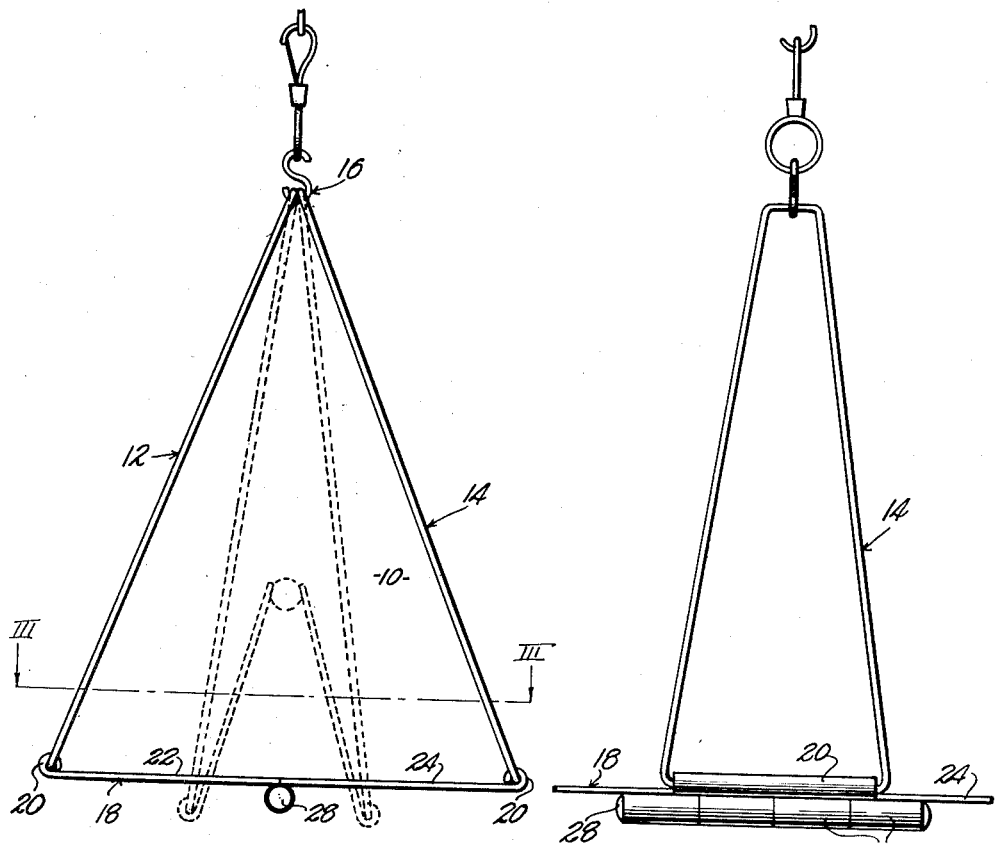
Fig. 1.
Fig. 2.
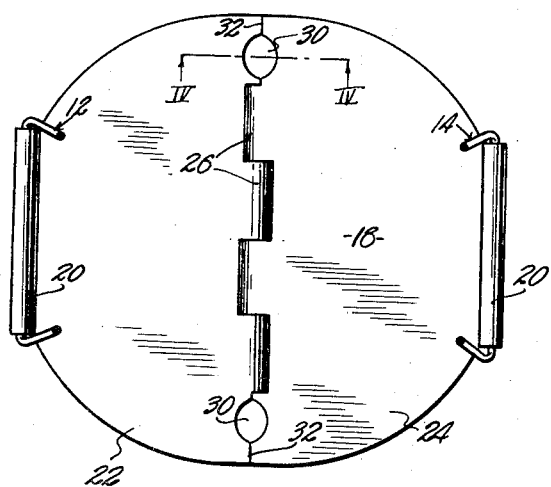
Fig. 3.
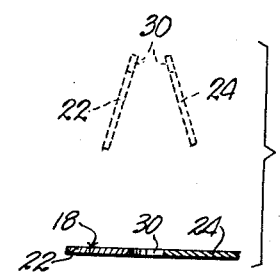
Fig. 4.
INVENTOR.
Ralph S. Zebarth
BY 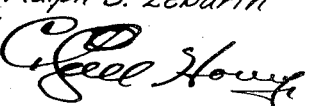
ATTORNEY Dec. 21, 1954
R. S. ZEBARTH
2,697,246
POULTRY HOLDING SHACKLE
Filed Sept. 5, 1950
2 Sheets-Sheet 2
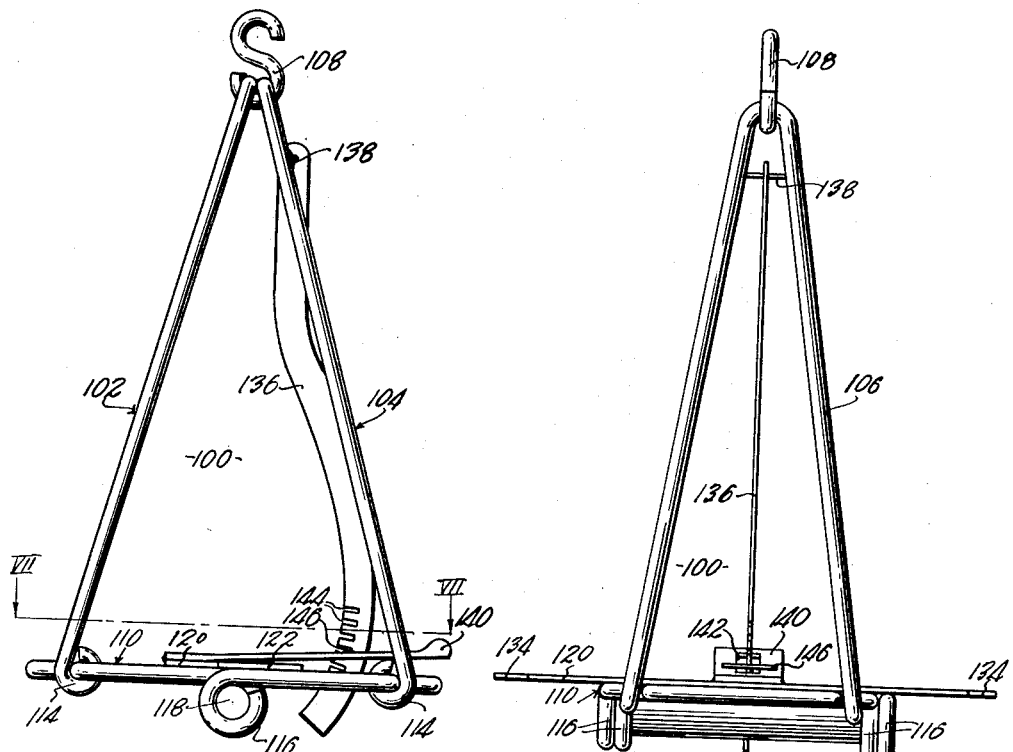
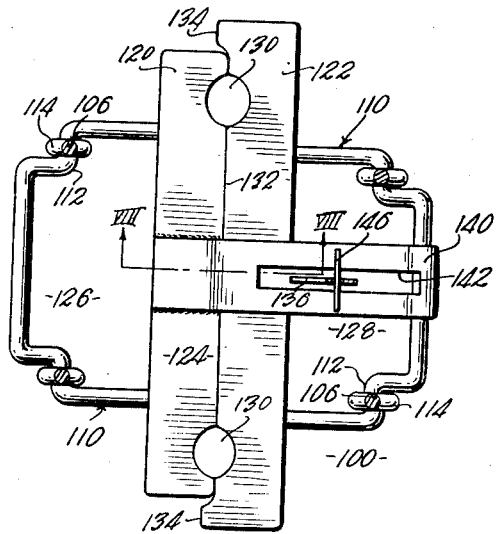
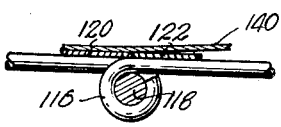
Fig. 8.
INVENTOR.
Ralph S. Zebarth
BY 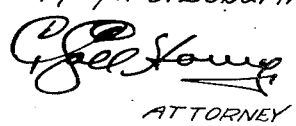
ATTORNEY

United States Patent Office 2,697,246
Patented Dec. 21, 1954

2,697,246

POULTRY HOLDING SHACKLE

Ralph S. Zebarth, Hickman Mills, Mo., assignor to Gordon W. Johnson Company, Kansas City, Mo., a corporation of Missouri Application September 5, 1950, Serial No. 183,124

6 Claims. (Cl. 17—44.1)

This invention has to do with equipment used in the dressing of poultry and more particularly to structure or shackles for holding the poultry being picked, slaughtered and/or singed in a condition suspended by the legs thereof while the dressing process is being carried out.

It is the most important object of this invention to present a shackle for poultry that is smple and therefore, inexpensive to manufacture and that is highly advantageous from the standpoint of use through the provision of means to permit quick and simple operation and thereby to maintain a speedy dressing process.

It is one of the important objects of this invention to provide a shackle that has a suspendible support including a sectional member wherein the sections are normally coplanar and having leg-receiving openings formed therein that are conditioned for receiving the legs of the poultry only when the aforesaid sections are moved from said coplanar condition.

Another object of this invention is to provide a shackle that includes a triangular-shaped frame or support wherein the sides thereof are all pivotally interconnected and the base of the triangle includes a pair of hingedly interconnected sections having the above mentioned leg-receiving openings on the hinge line.

A further object of this invention is the provision of a shackle that includes a hingedly interconnected base or side portion, together with a lock that is capable of holding the leg-receiving base in a plurality of selected positions.

Other more minor objects will be made clear or become apparent as the following specification progresses, reference being had to the accompanyng drawings, wherein:

Figure 1 is a side elevational view of one form of poultry holding shackle made pursuant to the present invention.

Fig. 2 is an end elevational view thereof.

Fig. 3 is a transverse, cross-sectional view taken on line III—III of Fig. 1, looking in the direction of the arrows.

Fig. 4 is a detailed, transverse, sectional view taken on line IV—IV of Fig. 3 showing one position of the swingable supports.

Fig. 5 is a side elevational view of another form of poultry-holding shackle.

Fig. 6 is an end elevational view of the shackle shown in Fig. 5.

Fig. 7 is a transverse, cross-sectional view taken on line VII—VII of Fig. 5; and Fig. 8 is a detailed, cross-sectional view taken on line VIII—VIII of Fig. 7.

The entire shackle about to be described is made from a minimum number of parts and includes a support broadly designated by the numeral 10 that is substantially triangular-shaped as illustrated in Fig. 1 of the drawings.

Support 10 includes a pair of identical sides 12 and 14, each of which is also substantially triangular with the apex end thereof adapted to receive an S-shaped bail member 16, whereby the shackle may be suspended from an overhead conveyor, not shown.

Sides 12 and 14 are rendered inexpensive in manufacture and light in weight by producing the same from a single length of wire or the like, having legs that diverge as the lowermost base ends of the sides are approached where the same pivotally join with a flat, inter-connecting plate 18 through the medium of hinge barrels 20.

While the base 18 is shown as substantially circular in Fig. 3, the particular form and shape thereof is of no significance and may be varied as desired. Plate 18 includes a pair of preferably identical sections 22 and 24 provided with hinge means at the proximal edges thereof that includes a plurality of barrels 26 on each of the sections 22 and 24 interlocked in the manner shown by Fig. 3 and pivotally joined by means of a hinge pin 28.

The sections 22 and 24 are provided with a pair of spaced-apart openings 30 on the line of hinge or at the point of abutment 32 of the adjacent edges of sections 22 and 24. It is noted that the openings 30 are disposed outwardly from each end respectively of the pivot pin 28 and the interlocking barrels 26.

Figure 1 of the drawings illustrates the manner of use of the aforesaid shackle and includes the buckling of plate member 18 on the hinge 26—28 to move the sections 22 and 24 out of their common substantially horizontal plane to a point where the sections 22 and 24 diverge as the lowermost ends are approached. Such condition of the shackle is shown by dotted lines in Fig. 1 and it is to be noted that the hinge 26—28 is moved upwardly in a substantially vertical path while the barrels 20 of sections 22 and 24 move downwardly and inwardly in an arc. Such action is permitted by virtue of the pivotal connection between the base lengths of sides 12 and 14 with sections 22 and 24 respectively, together with the pivotal or swinging connection between the uppermost lengths of the sides 12 and 14 within the bail member 16. Normally, when the shackle is in the condition illustrated in Fig. 3, the openings 30 are closed, but when the plate 18 is buckled in the manner shown by dotted lines in Fig. 1, such openings 30 are opened by virtue of the innermost edges 32 moving apart. When in such condition it is a simple matter to move the legs of the poultry to be suspended by the shackle 10 into openings 30, whereupon on downward movement of hinge 26—28, will return the openings 30 to the closed condition shown in Fig. 3 and adapt the same for holding the poultry in a suspended condition depending from the lowermost face of plate 18.

Shackle 10 is easy to use not only in the placement of the fowl thereon, but in removal of the same since the operator merely grasps the two legs in two hands and facing one end of the shackle 10, raises the plate 18 upwardly while simultaneously inserting the legs of the fowl into the shackle openings 30. Abutting engagement 32 of the innermost edges of sections 22 and 24 maintains the sections normally coplanar and prevent downward movement of the hinge pin 28 beyond that illustrated in full lines by Figs. 1 and 2.

In the modified form of the present invention illustrated by Figs. 5 to 8 inclusive, there is provided a shackle 100 that includes a pair of identical triangular-shaped sides 102 and 104, each of which includes a V-shaped portion 106 having its apex end or bight looped over an S-shaped bail 108 for suspended and pivotal support thereby. The base of the sides 102 and 104 is formed through the medium of a U-shaped member 110 for each side 102 and 104 respectively. The members 110 are each provided with a pair of offset portions 112 that pivotally receive eyelets or hinge barrels 114 formed on the free ends of the legs of each portion 106 respectively. Similarly, the free ends of the legs of the two U-shaped members 110 are each provided with an eyelet or hinge barrel 116, the four eyelets 116 being joined by a hinge pin 118.

The legs of the U-shaped members 110 are joined by a pair of elongated bars 120 and 122 having their proximal innermost edges in abutting relationship when in the normal condition illustrated in Fig. 7. Consequently, the base portion 124 of the triangular-shaped shackle 100 includes a pair of sections 126 and 128, each of which in turn includes a U-shaped member 110 and a bar 120 or 122 as the case may be.

A pair of spaced-apart perforations 130 is formed in the plate that comprises bars 120 and 122, said perforations 130 being on the longitudinal axis of hinge pin 118 and on the line of abutment 132 of the bars 120 and 122. It is to be noted that hinge pin 118 is substantially parallel with the axis of rotation of offset portions 112 within eyelets or barrels 114. The sections 126 and 128 of base 124 are normally coplanar as illustrated in Figs. 1 and 2 and when the shackle 100 is placed in use, base 124 is buckled upwardly in the same manner as above described and illustrated in Fig. 1 to open the perforations 130 and thereby permit the insertion of the poultry legs. Bar 122 is slightly longer than bar 120 and provided with rounded, overlapping portions 134 so formed as to prevent catching or lodgment upon other equipment along the path of travel of a plurality of the shackles 100.

A locking device is provided for the shackle 100 which, as will hereinafter appear, may well be adapted to the form illustrated in Figs. 1 to 4 inclusive if desired. Such locking member includes an elongated arm or rack 136 pivotally interconnected at the uppermost end thereof through the medium of a cross pin 138 joining the downwardly diverging legs of portion 106 of side 104 adjacent the bail 108. The bar 120 has an elongated plate 140 secured directly to the uppermost face thereof in any suitable manner such as by welding and preferably midway between the ends of bar 120. Plate 140 extends toward the side 104 in overlying relationship to the bar 122 and angles upwardly as shown in Fig. 1 as the outermost free end thereof is approached. Plate 140 extends between the legs of portion 106 of side 104 and is provided with an elongated, longitudinally extending slot 142 for receiving the proximal end of the arm 136. Said arcuate end of the arm 136 is in turn provided with a plurality of notches 144 adapted to selectively receive a cross pin 146 on the plate 140 and intersecting the slot 142 intermediate the ends of the latter. It is seen that sufficient space is provided between the pin 146 and the outermost end of slot 142 to permit free swinging movement of the arm 136 whereby the notches 144 are removed from pin 146. When the pin 146 is within one of the notches 144, base portion 124 is held against buckling and through use of the locking device just described, there is no possibility of the fowl suspended by shackle 100 accidentally becoming dislodged while the dressing operation takes place.

It is now seen that the shackle member hereof when the same takes the form of Figs. 1 to 4 inclusive, or that of Figs. 5 to 8 inclusive, is extremely simple, inexpensive to manufacture and can be placed in use with minimum effort on the part of the operator. Furthermore, in each case the shackle is made so as to reduce the possibility of accidental hooking or catching upon other equipment within the poultry dressing plant.

The two embodiments herein illustrated exemplify the way in which the broad concepts hereof may be changed or altered and therefore, it is desired to be limited only by the spirit of the invention as defined by the scope of the appended claims.

Having thus described the invention, what is claimed as new and desired to be secured by Letters Patent is:

1. A poultry shackle comprising a member having a pair of spaced, normally closed, leg-receiving perforations, said member being split on a line extending through the perforations, presenting a pair of sections normally disposed in virtually the same, substantially horizontal plane; a support including a side element for each section respectively and extending upwardly therefrom; suspension means spaced above the member and pivotally interconnecting the elements at the uppermost ends of the latter for relative swinging movement; pivot means for each element respectively connecting the same with the sections at the lowermost ends of the elements for swinging movement of the sections relative to the elements, the line of split being between the pivot means; hinge means parallel to said line of split pivotally interconnecting the sections for swinging movement, buckled upwardly to a biplanar position between the elements with the sections converging upwardly toward the hinge means, whereby to open said perforations for reception of poultry legs; and means holding the sections against relative swinging movement downwardly below said plane.

2. A poultry shackle as set forth in claim 1 wherein the axes of swinging movement of the sections on said pivot means and on said hinge means are substantially parallel.

3. A poultry shackle comprising a member having a pair of spaced, normally closed, leg-receiving perforations, said member being split on a line extending through the perforations, presenting a pair of sections normally disposed in virtually the same, substantially horizontal plane, and in abutting relationship at the line of split when the sections are in said plane; a support including a side element for each section respectively and extending upwardly therefrom; suspension means spaced above the member and pivotally interconnecting the elements at the uppermost ends of the latter for relative swinging movement; pivot means for each element respectively connecting the same with the sections at the lowermost ends of the elements for swinging movement of the sections relative to the elements, the line of split being between the pivot means; and hinge means below the member along said line of split and pivotally interconnecting the sections for swinging movement, buckled upwardly to a biplanar position between the elements with the sections converging upwardly toward the hinge means, whereby to open said perforations for reception of poultry legs.

4. A poultry shackle comprising a member having a pair of spaced, normally closed, leg-receiving perforations, said member being split on a line extending through the perforations, presenting a pair of sections normally disposed in virtually the same, substantially horizontal plane; a support including a side element for each section respectively and extending upwardly therefrom; suspension means spaced above the member and pivotally interconnecting the elements at the uppermost ends of the latter for relative swinging movement; pivot means for each element respectively connecting the same with the sections at the lowermost ends of the elements for swinging movement of the sections relative to the elements, the line of split being between the pivot means; hinge means parallel to said line of split pivotally interconnecting the sections for swinging movement, buckled upwardly to a biplanar position between the elements with the sections converging upwardly toward the hinge means, whereby to open said perforations for reception of poultry legs; means holding the sections against relative swinging movement downwardly below said plane; and releasable means interconnecting one of the sections and the support for holding the sections against buckling.

5. A poultry shackle comprising a member having a pair of spaced, normally closed, leg-receiving perforations, said member being split on a line extending through the perforations, presenting a pair of sections normally disposed in virtually the same, substantially horizontal plane; a support including a side element for each section respectively and extending upwardly therefrom; suspension means spaced above the member and pivotally interconnecting the elements at the uppermost ends of the latter for relative swinging movement; pivot means for each element respectively connecting the same with the sections at the lowermost ends of the elements for swinging movement of the sections relative to the elements, the line of split being between the pivot means; hinge means parallel to said line of split pivotally interconnecting the sections for swinging movement, buckled upwardly to a biplanar position between the elements with the sections converging upwardly toward the hinge means, whereby to open said perforations for reception of poultry legs; and releasable means interconnecting one of the sections and the support for holding the sections against relative swinging movement.

6. A poultry shackle as set forth in claim 5 wherein said releasable means includes a movable device mounted on the element of one of said sections, an extension on the other section, and means releasably interlocking said device and said extension.

References Cited in the file of this patent

UNITED STATES PATENTS

| Number | Name | Date |
| --- | --- | --- |
| 1,411,695 | Hackett | Apr. 4, 1922 |
| 2,363,950 | Fearon | Nov. 28, 1944 |
| 2,533,941 | Johnson | Dec. 12, 1950 |